(12) United States Patent
Iwazaki et al.

(10) Patent No.: US 7,487,020 B2
(45) Date of Patent: *Feb. 3, 2009

(54) DRIVING ASSIST APPARATUS AND METHOD FOR VEHICLE

(75) Inventors: Katsuhiko Iwazaki, Shizuoka-ken (JP); Hisashi Satonaka, Susono (JP); Yuichi Kubota, Okazaki (JP); Tomohiko Endo, Toyota (JP); Akira Matsui, Toyota (JP); Hideyuki Iwakiri, Tajimi (JP); Toru Sugiyama, Toyota (JP); Seiji Kawakami, Susono (JP); Hiroaki Kataoka, Susono (JP); Arata Takahashi, Nagoya (JP); Yoshiki Ninomiya, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 514 days.

This patent is subject to a terminal disclaimer.

(21) Appl. No.: 10/871,013

(22) Filed: Jun. 21, 2004

(65) Prior Publication Data
US 2005/0021203 A1    Jan. 27, 2005

(30) Foreign Application Priority Data
Jun. 26, 2003    (JP)    ............... 2003-183043

(51) Int. Cl.
  *B62D 6/00* (2006.01)
  *B62D 6/04* (2006.01)
  *B60S 9/00* (2006.01)
  *G05D 1/00* (2006.01)

(52) U.S. Cl. ............... 701/41; 701/23; 701/25; 701/44; 180/204

(58) Field of Classification Search ............ 701/36, 701/23, 25, 41, 44, 301, 302; 180/167, 169, 180/204; 700/253
See application file for complete search history.

(56) References Cited

U.S. PATENT DOCUMENTS

| 4,931,930 | A | | 6/1990 | Shyu et al. | |
|---|---|---|---|---|---|
| 5,219,036 | A | * | 6/1993 | Schwager et al. | ............ 180/168 |
| 6,070,684 | A | | 6/2000 | Shimizu et al. | |
| 6,226,573 | B1 | * | 5/2001 | Okawa et al. | ................. 701/25 |

(Continued)

FOREIGN PATENT DOCUMENTS

DE    100 30 449 A1    6/1999

(Continued)

OTHER PUBLICATIONS

U.S. Appl. No. 10/871,032, filed Jun. 21, 2004, Iwazaki et al.

(Continued)

*Primary Examiner*—Thomas G Black
*Assistant Examiner*—Christine M Behncke
(74) *Attorney, Agent, or Firm*—Oliff & Berridge, PLC

(57) ABSTRACT

A driving assist apparatus for a vehicle that guides the vehicle to a target position is provided. On the basis of the present direction of the vehicle and the direction of the vehicle at the target position, a basic path that changes the vehicle direction so as to coincide with the target direction of the vehicle at the target position is computed. A path from the present position to the target position is computed by adding a straight-line path to the basic path under a predetermined condition.

18 Claims, 14 Drawing Sheets

U.S. PATENT DOCUMENTS

| | | | |
|---|---|---|---|
| 6,314,341 B1 * | 11/2001 | Kanayama | 701/1 |
| 6,519,514 B2 | 2/2003 | Mizutani | |
| 6,826,469 B2 | 11/2004 | Iwata et al. | |
| 6,919,822 B2 * | 7/2005 | Tanaka et al. | 340/932.2 |
| 7,103,461 B2 * | 9/2006 | Iwazaki et al. | 701/41 |
| 2001/0026317 A1 | 10/2001 | Kakinami et al. | |

FOREIGN PATENT DOCUMENTS

| | | |
|---|---|---|
| DE | 199 40 007 A1 | 3/2001 |
| JP | A-04-160608 | 6/1992 |
| JP | A 5-297935 | 11/1993 |
| JP | A-05-322592 | 12/1993 |
| JP | A 2001-1929 | 1/2001 |
| JP | A-2001-018821 | 1/2001 |
| JP | A-2001-138941 | 5/2001 |
| JP | A-2004-338637 | 12/2004 |
| JP | A-2004-352120 | 12/2004 |
| WO | WO 2004/050458 A1 | 6/2004 |

OTHER PUBLICATIONS

U.S. Appl. No. 10/871,011, filed Jun. 21, 2004, Iwazaki et al.
U.S. Appl. No. 10/870,919, filed Jun. 21, 2004, Iwazaki et al.

* cited by examiner ic apparatus and method for a vehicle described below are provided. A driving assist apparatus in accordance with a first form of the invention includes: a detecting portion that detects an initial deflection angle at an initial position of the vehicle, the deflection angle being an angle formed between a direction of the vehicle at a target position and a direction of the vehicle at a present direction of the vehicle; a setting portion that sets a basic path along which the deflection angle is changed from the initial deflection angle to a state of the deflection angle of 0 by steering under a predetermined condition in accordance with a running distance, as a change in the running distance with respect to one of a steering angle and a turning curvature; and a computing portion that computes a target path that extends from the initial position to the target position by using the basic path as a basis and adding a straight-line path to at least one of a site forward of the basic path and a site rearward of the basic path under a predetermined condition.

US 7,487,020 B2

DRIVING ASSIST APPARATUS AND METHOD FOR VEHICLE

INCORPORATION BY REFERENCE

The disclosure of Japanese Patent Application No. 2003-183043 filed on Jun. 26, 2003, including the specification, drawings and abstract is incorporated herein by reference in its entirety.

BACKGROUND OF THE INVENTION

1. Field of the Invention

The invention relates to vehicular driving assist apparatus and method for determining a locus of run to a target position and assisting the driving of a vehicle so that the vehicle follows the locus of run.

2. Description of the Related Art

A related-art technology for guiding a vehicle to a target position through the use of the automatic steering, the steering command, etc., is disclosed in, for example, Japanese Patent Application Laid-Open Publication No. 5-297935. In this related technology, in order to precisely guide a vehicle to a target position and cause the azimuth angle of the vehicle at the target position to coincide with a target azimuth angle, three basic track patterns are prepared. Then, in order to compensate for errors in position, azimuth angle and curvature, a cubic equation is solved. Using the thus-provided solution, the track patterns are similarity-transformed so as to set a target track.

However, in this related technology, since it is necessary to solve a cubic equation and therefore perform computation of complex numbers, the load of computation becomes great. Therefore, the real-time execution of this calculation is difficult for the existing computing units installed in vehicles. Furthermore, the use of a high-performance computing unit leads to a cost increase, and is therefore unfavorable.

SUMMARY OF THE INVENTION

As forms of the invention, driving assist apparatus and method for a vehicle described below are provided. A driving assist apparatus in accordance with a first form of the invention includes: a detecting portion that detects an initial deflection angle at an initial position of the vehicle, the deflection angle being an angle formed between a direction of the vehicle at a target position and a direction of the vehicle at a present direction of the vehicle; a setting portion that sets a basic path along which the deflection angle is changed from the initial deflection angle to a state of the deflection angle of 0 by steering under a predetermined condition in accordance with a running distance, as a change in the running distance with respect to one of a steering angle and a turning curvature; and a computing portion that computes a target path that extends from the initial position to the target position by using the basic path as a basis and adding a straight-line path to at least one of a site forward of the basic path and a site rearward of the basic path under a predetermined condition.

A driving assist method in accordance with the first form of the invention includes the steps of: detecting an initial deflection angle at an initial position of the vehicle, the deflection angle being an angle formed between a direction of the vehicle at a target position and a direction of the vehicle at a present direction of the vehicle; setting a basic path along which the deflection angle is changed from the initial deflection angle to a state of the deflection angle of 0 by steering under a predetermined condition in accordance with a running distance, as a change in the running distance with respect to one of a steering angle and a turning curvature; and computing a target path that extends from the initial position to the target position by using the basic path as a basis and adding a straight-line path to at least one of a site forward of the basic path and a site rearward of the basic path under a predetermined condition.

According to the above-described driving assist apparatus and method, the basic path that changes the vehicle orientation from the present direction of the vehicle to the direction of the vehicle at the target position by performing the steering under a predetermined condition is substantially based only on the azimuth angle, so that a path can be determined by relatively simple computation. A target path is computed by adding a straight-line path to the path set as described above. Thus, computing a path is easy, and a path can be computed with high precision.

A driving assist apparatus in accordance with a second form of the invention includes a detecting portion that detects an initial deflection angle at an initial position of the vehicle, the deflection angle being an angle formed between a direction of the vehicle at a target position and a direction of the vehicle at a present direction of the vehicle; a first setting portion that sets a first basic path along which the deflection angle is changed from the initial deflection angle to a predetermined deflection angle by steering under a predetermined condition in accordance with a running distance, as a change in the running distance with respect to one of a steering angle and a turning curvature; a second setting portion that sets a second basic path along which the deflection angle is changed from the predetermined deflection angle to a state of the deflection angle of 0 by steering under a predetermined condition in accordance with the running distance, as a change in the running distance with respect to one of the steering angle and the turning curvature; and a computing portion that computes a target path that extends from the initial position to the target position by using the first basic path and the second basic path as a basis and adding a straight-line path to at least one of a site forward of the first basic path, a site between the first basic path and the second basic path, and a site rearward of the second basic path under a predetermined condition.

A driving assist method in accordance with the second form of the invention includes the steps of: detecting an initial deflection angle at an initial position of the vehicle, the deflection angle being an angle formed between a direction of the vehicle at a target position and a direction of the vehicle at a present direction of the vehicle; setting a first basic path along which the deflection angle is changed from the initial deflection angle to a predetermined deflection angle by steering under a predetermined condition in accordance with a running distance, as a change in the running distance with respect to one of a steering angle and a turning curvature; setting a second basic path along which the deflection angle is changed from the predetermined deflection angle to a state of the deflection angle of 0 by steering under a predetermined condition in accordance with the running distance, as a change in the running distance with respect to one of the steering angle and the turning curvature; and computing a target path that extends from the initial position to the target position by using the first basic path and the second basic path as a basis and adding a straight-line path to at least one of a site forward of the first basic path, a site between the first basic path and the second basic path, and a site rearward of the second basic path under a predetermined condition.

According to the above-described driving assist apparatus and method, basic paths (in this case, two basic paths, that is, the first basic path and the second basic path) are set substantially on the basis of only changes in the azimuth angle, and at least one straight-line path is added to a site forward or rearward of the basic paths or between the basic paths, so as to determine a target path. Therefore, even in a case where it is necessary to increase the deflection angle until an intermediate point on the path is reached, and then decrease the deflection angle so that the vehicle direction coincides with the target position vehicle direction as in the case of parallel parking, computation of a path is easy, and a path can be computed with high accuracy.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DESCRIPTION OF THE EXEMPLARY EMBODIMENTS

In the following description, the present invention will be described in more detail in terms of exemplary embodiments.

Figure 1:
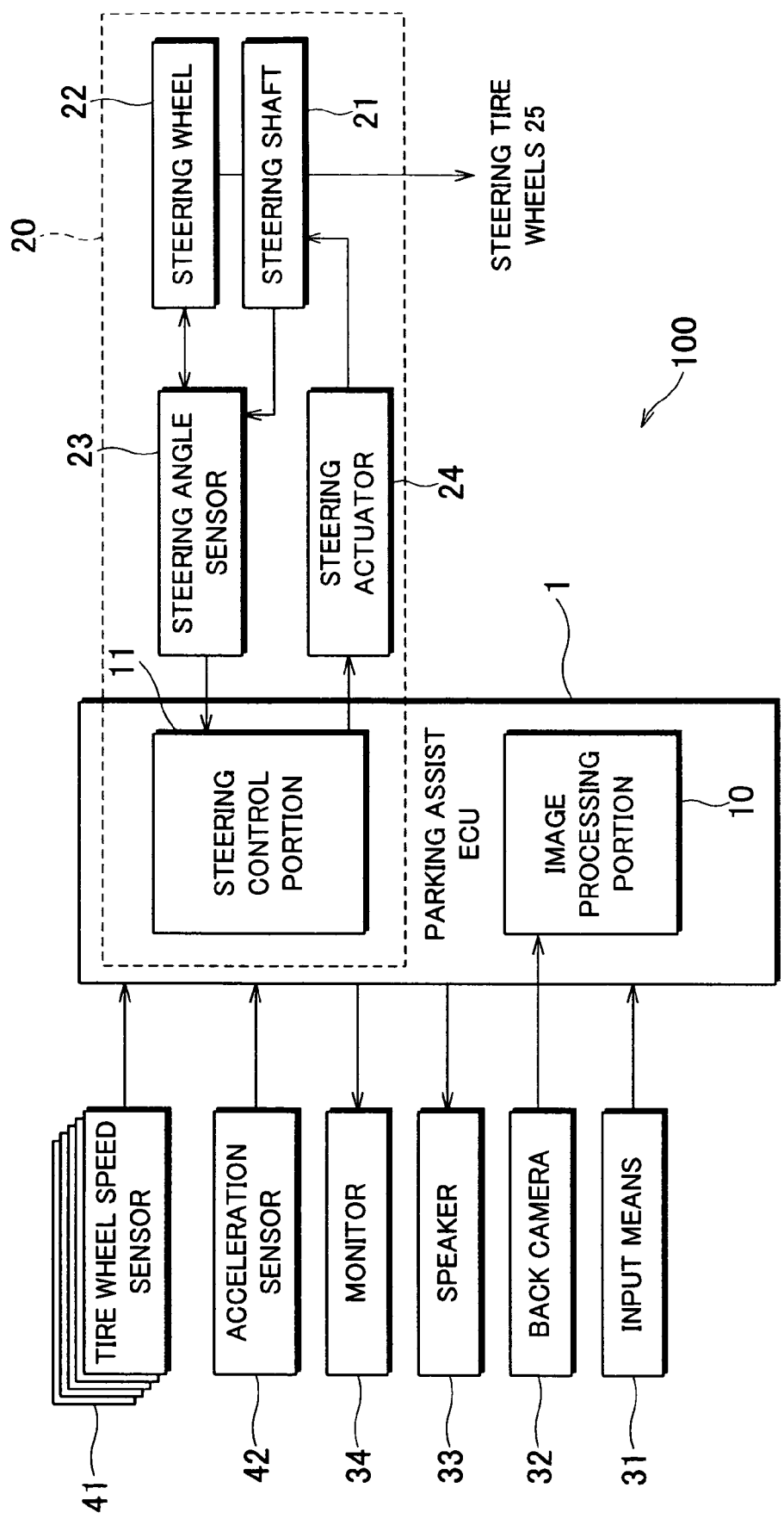
FIG. 1 is a block diagram illustrating the construction of a parking assist apparatus in accordance with an embodiment of the invention.

A driving assist apparatus in accordance with the invention will be described below with reference to a parking assist apparatus as an example. FIG. 1 is a block diagram illustrating the construction of a parking assist apparatus 100 in accordance with an embodiment of the invention. The parking assist apparatus 100 has an automatic steering device 20, and is controlled by a parking assist ECU 1 that is a control device. The parking assist ECU 1 is formed by a CPU, a ROM, a RAM, an input signal circuit, an output signal circuit, a power supply circuit, etc. Furthermore, the parking assist ECU 1 has an image processing portion 10 that processes images acquired via a back camera 32 described below, and a steering control portion 11 that controls an automatic steering device. The image processing portion 10 and the steering control portion 11 may be separate from each other in terms of hardware within the parking assist ECU 1, or may be separate in terms of software while sharing the CPU, the ROM, the RAM, etc. that are provided in the parking assist ECU 1.

A steering angle sensor 23 for detecting the amount of steer of a steering shaft 21 that transfers the movement of a steering wheel 22 to steering tire wheels 25, and a steering actuator 24 that provides steering force are connected to the steering shaft 21. In addition to providing a steering force during an automatic steering mode, the steering actuator 24 may serve as a power steering device that provides an assist steering force while a driver is steering. The steering control portion 11 controls the driving of the steering actuator 24.

The steering control portion 11 receives an output signal of the steering angle sensor 23, and also receives output signals of tire wheel speed sensors 41 that are provided for the individual tire wheels for detecting the rotation speeds thereof and an output signal of an acceleration sensor 42 that detects the acceleration of the vehicle.

The aforementioned image processing portion 10 receives an image signal, that is, an output signal of the back camera 32 disposed at a rear portion of the vehicle for acquiring mages in a rearward direction. The image processing portion 10 is connected to input means 31 for accepting a driver's input operation in conjunction with the parking assist, a monitor 34 for displaying information in the form of images to a driver, and a speaker 33 for presenting information in the form of sounds and voices.

Figure 2:
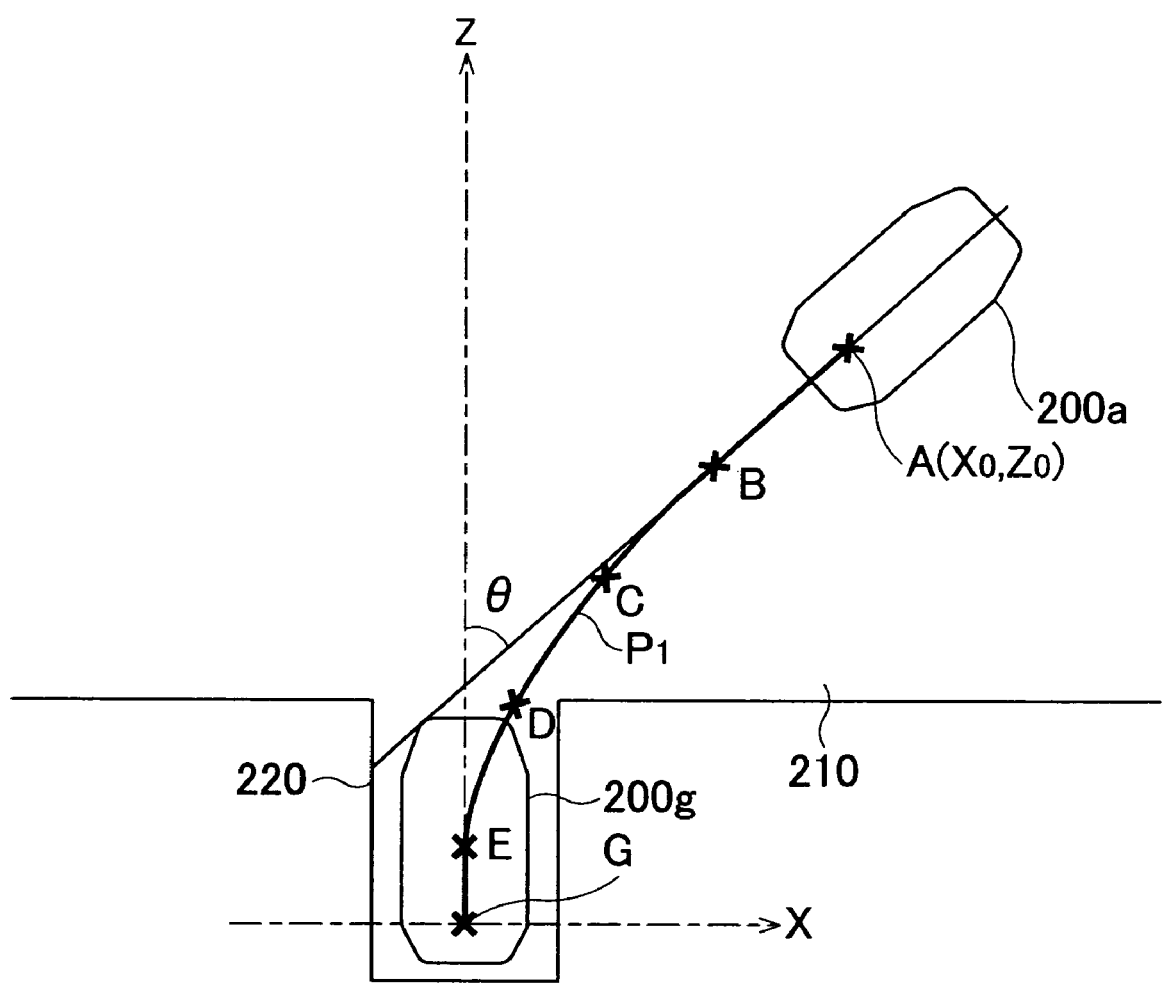
FIG. 2 is a diagram illustrating a garage parking operation that is a parking assist in a first control form of the apparatus shown in FIG. 1.

Next, assist operations of the parking assist apparatus will be specifically described. Firstly, a first control form of assist operation will be described. In the first control form, an assist is performed for a "garage parking" operation as illustrated in FIG. 2 where a vehicle 200 is backed into a garage 220 that faces a road 210. FIG. 3 is a flowchart of a control in the first control form.

Figure 5A:
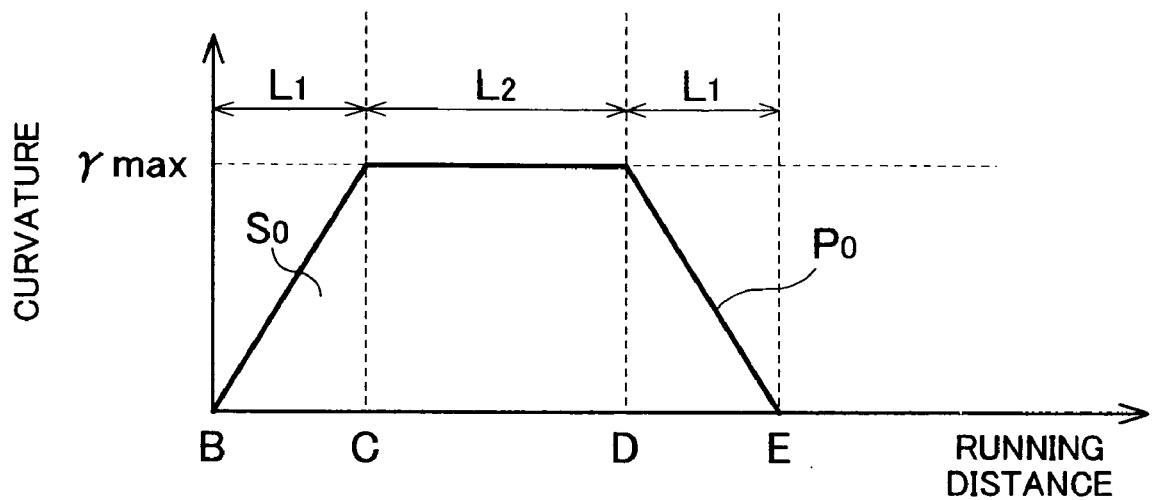
FIGS. 5A and 5B are diagrams each illustrating an assist path set by the control form illustrated in FIG. 3, as a relationship between the running distance and the turning curvature.
Figure 5B:
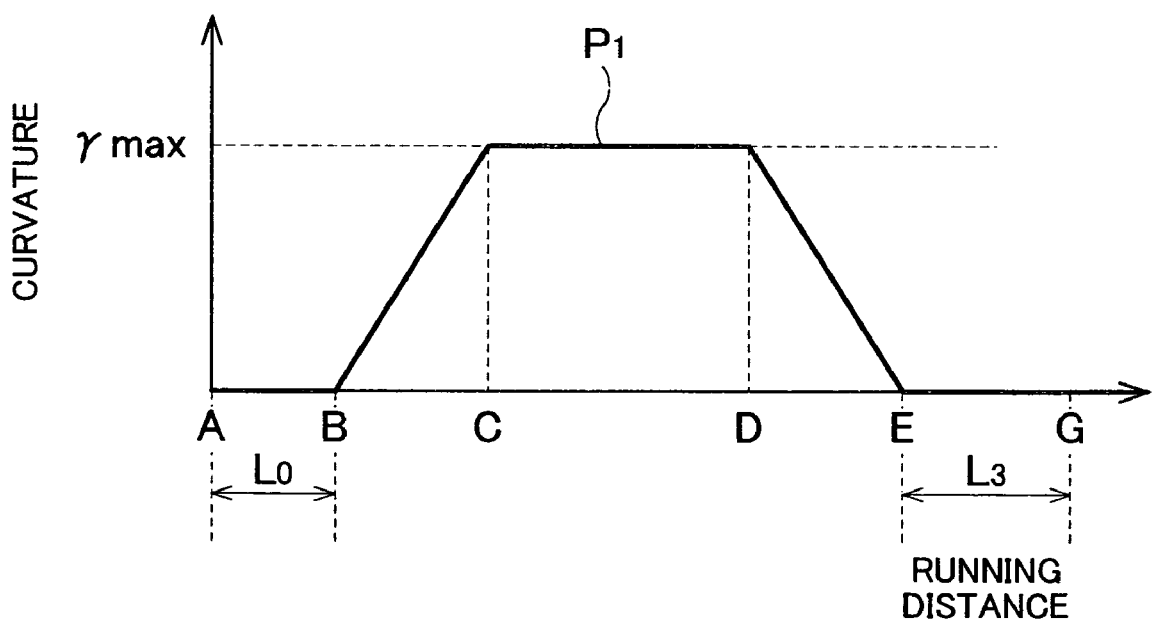
Figure 6:
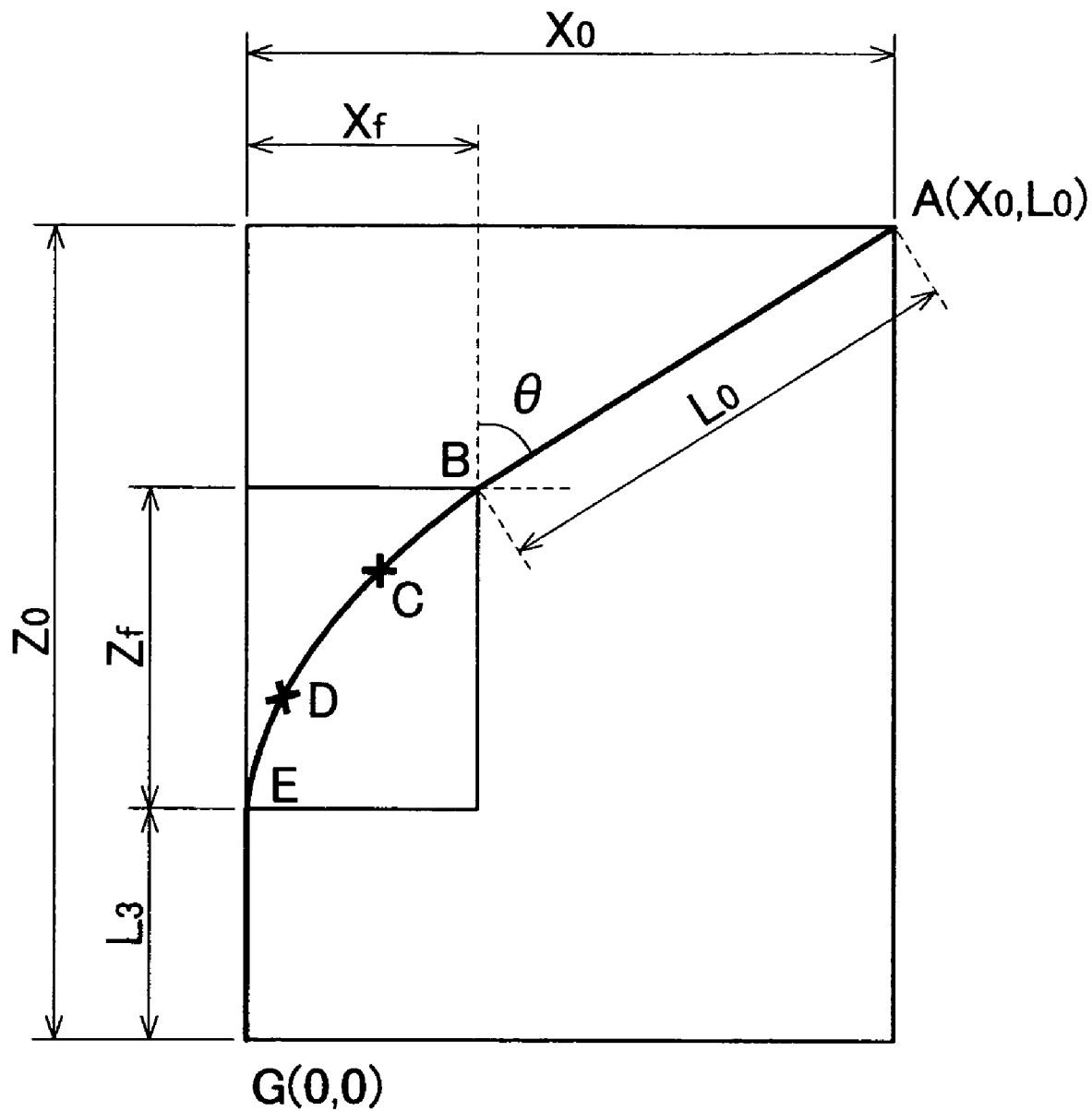
FIG. 6 is a diagram illustrating the assist path together with a positional relationship between a vehicle and the target position.

FIGS. 5A and 5B and FIG. 6 are diagrams each illustrating the setting of an assist path in this control. FIGS. 5A and 5B are diagrams each illustrating an assist path as a relationship between the running distance and the turning curvature. FIG. 6 is a diagram illustrating the assist path together with a positional relationship between the vehicle and the target position.

Figure 3A:
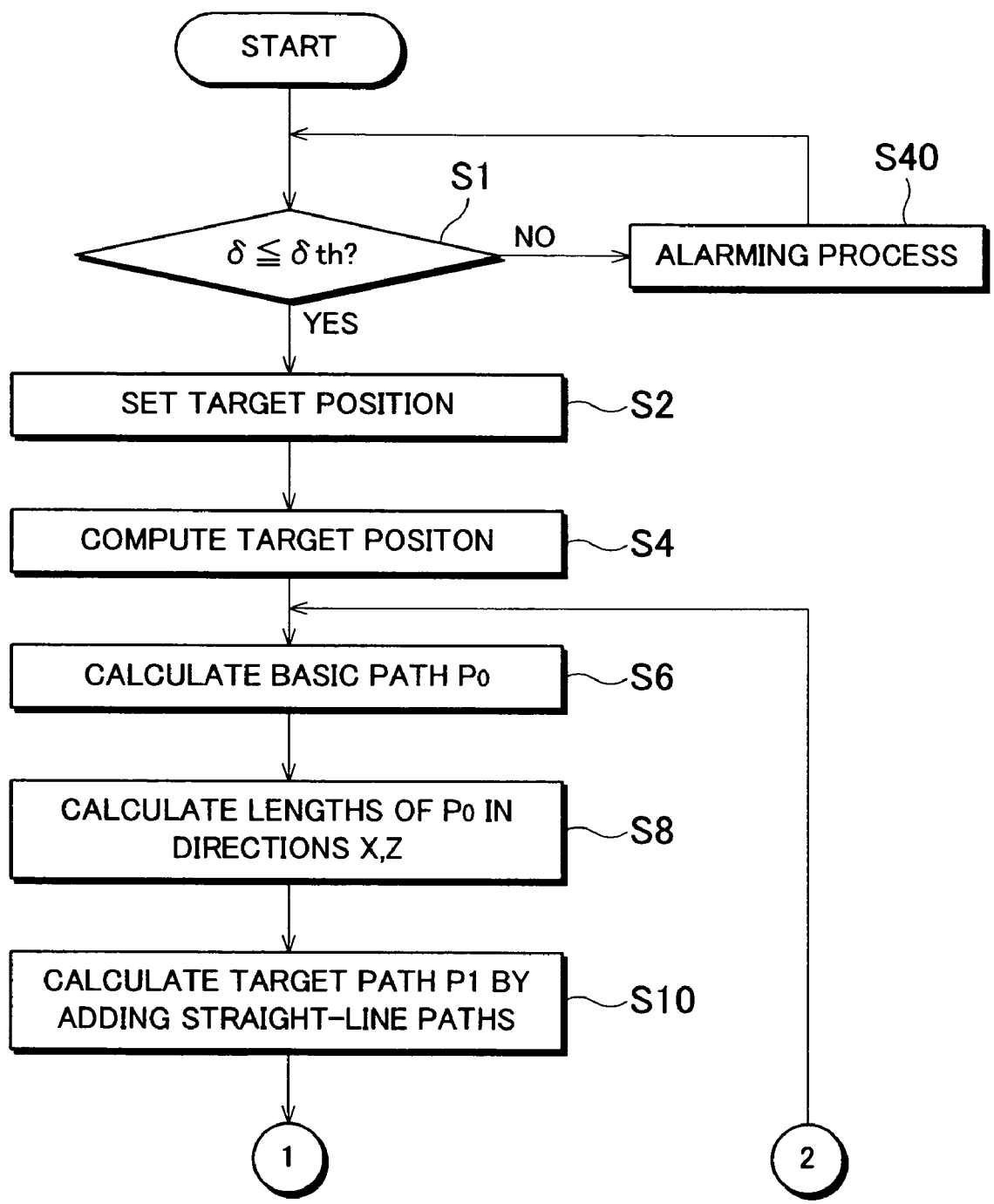
FIGS. 3A and 3B is a flowchart illustrating a control in the first control form of the apparatus shown in FIG. 1.
Figure 3B:
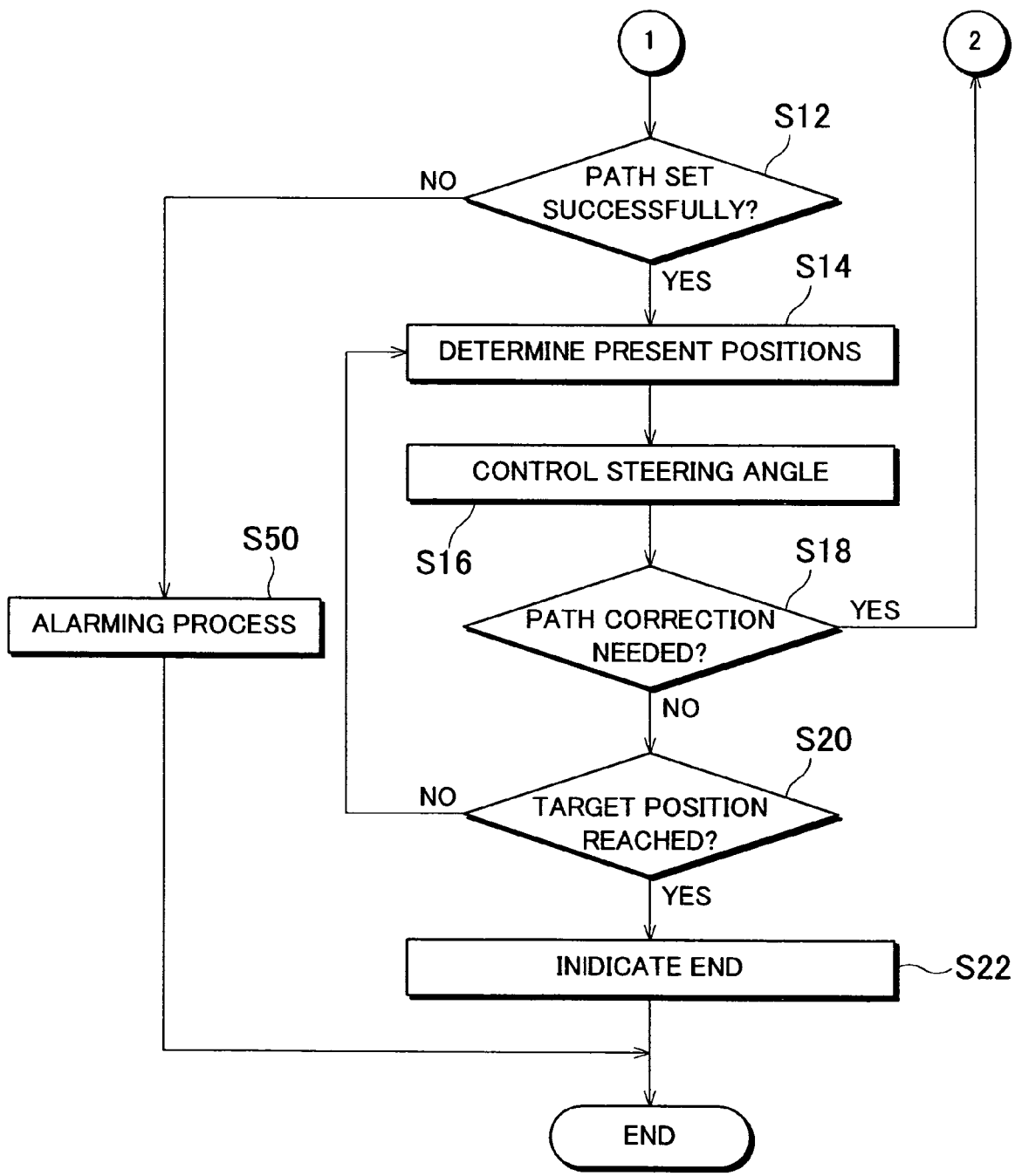

The control illustrated in FIGS. 3A and 3B is started after the output of a command for the parking assist ECU 1 to start the parking assist following a driver's operation of the input means 31, and continues to be executed by the parking assist ECU 1 until: i) the vehicle reaches the vicinity of a specified target parking position, or ii) it is determined that the vehicle cannot reach the target parking position by a single backing run. This control continues unless the assist operation is cancelled by a driver using the input means 31.

Specifically, a driver moves the vehicle to an arbitrary start position of parking assist, and recognizes a target position in a rearward image taken by the back camera 32 and displayed in the monitor 34. After that, the driver operates the input means 31 so as to start the parking assist control. If the target position is not seen in the display screen of the monitor 34, the driver moves the vehicle to a position where the target position can be seen in the display screen, and then start the assist. In the description below, it is assumed that a reference point of the vehicle 200 at the start position of the parking assist is a point A. The reference point A may be at other positions, for example, a center of a rear end of the vehicle, the center of gravity thereof, a front end of a side portion, a rear end of a side portion, etc. The vehicle being at the reference point A is indicated by 200a.

Figure 4:
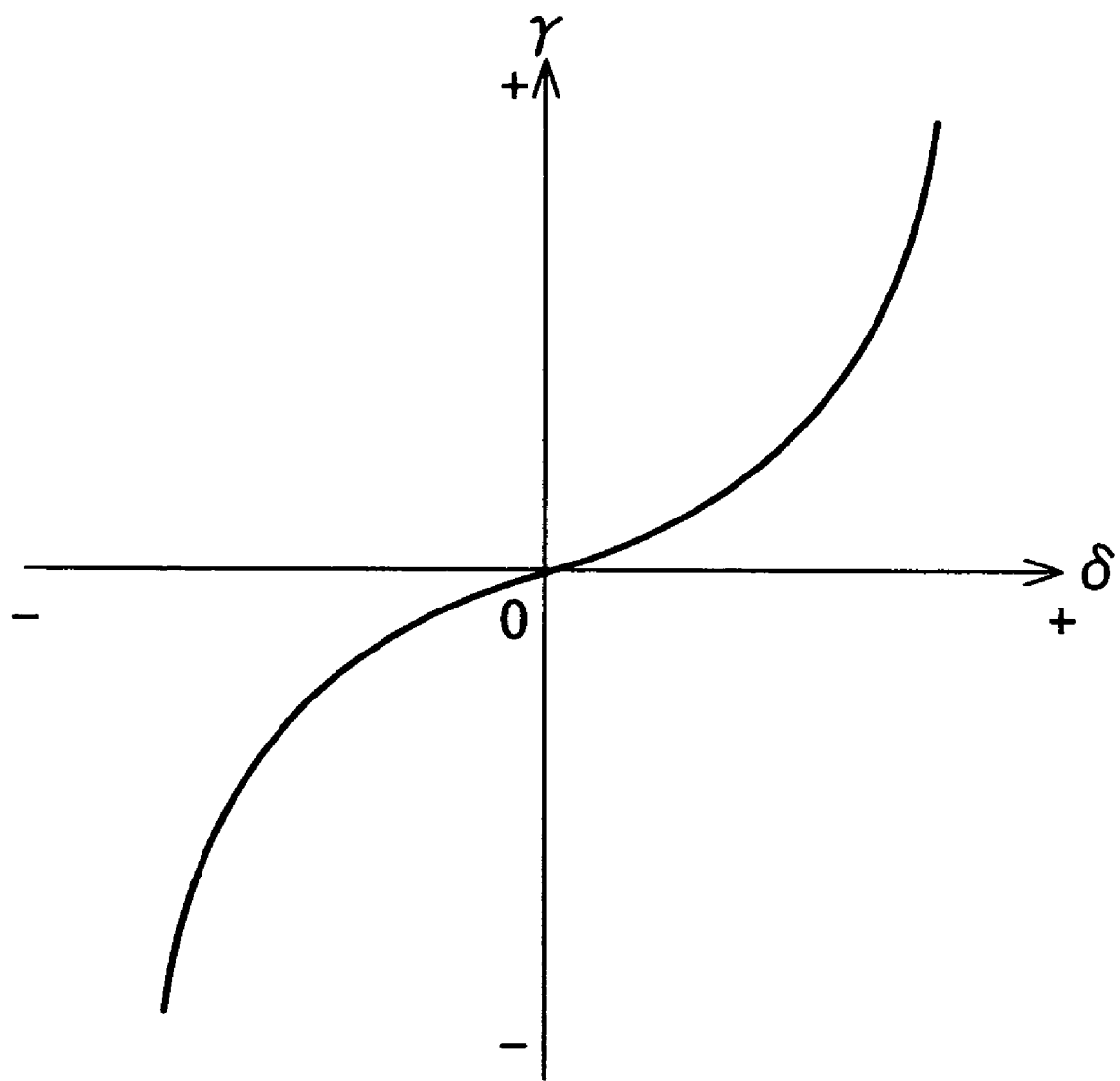
FIG. 4 is a diagram indicating a relationship between the steering angle δ and the turning curvature γ in the apparatus shown in FIG. 1.

The parking assist ECU 1 compares the absolute value of the steering angle δ from an output of the steering angle sensor 23 with a threshold value δth (step S1). If the steering angle δ is less than or equal to the threshold value δth, and is therefore sufficiently small, the parking assist ECU 1 determines that the vehicle is in a neutral steering angle state, and permits transition to a parking assist control. Subsequently, the process proceeds to step S2. As indicated in FIG. 4, in a region of and around the neutral steering angle state, the amount of turn of the steering tire wheels 25, that is, the curvature γ, is set small with respect to the steering angle δ, that is, the amount of rotation of the steering wheel 22 and the steering shaft 21. Therefore, it is appropriate to set the threshold value δth so as to prescribe a range where the curvature γ is substantially 0. For example, the threshold value δth is set at about 15 degrees. Conversely, if it is determined in step S1 that the steering angle is not in the neutral state, the process proceeds to step S40. In step S40, it is indicated to a driver via the speaker 33 and the monitor 34 that the steering angle is outside the control range. In this case, the parking assist ECU 1 prompts the driver to operate the steering wheel 22 so as to return it to the neutral steering angle state. After that, the process returns to step S1. Therefore, if the driver returns the steering angle substantially to the neutral state by a stationary steering operation or the like, the process changes to the parking assist control.

In step S2, the driver operates the input means 31 while watching a back camera 32-taken image displayed in the monitor 34. At this time, the driver sets a target parking position by moving a displayed parking frame to the target parking position in the display screen.

Through an image recognition process, the parking assist ECU 1 determines a vehicle position 200g at the target parking position, more specifically, the position of the reference point G and the direction of the vehicle at the position of the reference point G (step S4).

The position of the point G can be determined, for example, as relative coordinates with respect to the reference point A at the present vehicle position. The following description will be made with reference to a coordinate system as shown in FIG. 2 where the target position G is defined at the origin, and the direction of the vehicle at the target position is defined as the direction of the Z axis, and the direction perpendicular thereto is defined as the direction of the X axis. Hereinafter, the angle of the present direction of the vehicle with respect to the Z axis will be termed deflection angle θ. Furthermore, the position of the point A is expressed by coordinates ($x_0$, $z_0$).

Next, a shortest path (hereinafter, referred to as "basic path") $P_0$ that is needed in order to reduce the deflection angle θ to zero is computed from the present position (initial position point A), the present deflection angle $θ_0$ and the present steering angle δ (step S6).

This running locus $P_0$ is set as changes in the curvature of turn (=the reciprocal of the radius of turn) with respect to the distance of run. FIG. 5A shows a running distance-turning curvature graph of the shortest path $P_0$.

The shortest path $P_0$ includes a path where the steering angle is increased (First path), a path where the increased steering angle is maintained (Second path), and a path where the steering angle is returned to neutral (Third path). In each one of the first path and the third path, the amount of change in the turning curvature with respect to the running distance (the rate of change in the turning curvature) is set at a constant value. The rate of change in the turning curvature is set so that even when the vehicle speed is equal to an upper limit value for the driving assist, the amount of change in the turning curvature is less than the amount of change in the curvature achieved by the maximum steering rate of the steering actuator 24. Therefore, a path that allows a steering operation without fail can be computed.

Representative examples of the locus set in this case are as follows. Firstly, the steering angle is increased while the rate of change in the steering angle with respect to the running distance from an initial position point B to a point C is kept at a fixed value. In this case, when the point C is reached, the steering angle and the turning curvature become equal to their respective set maximum values, and the turning radius becomes equal to a set minimum turning radius (Rmin) (curvature γmax=1/Rmin) (First path). From the point C to a point D, this steering angle (turning curvature, turning radius) is maintained (Second path). From the point D, the steering angle is reduced while the rate of change in the steering angle with respect to the running distance is kept constant. In this case, the steering angle changes to the neutral state, that is, the steering angle of 0, when a point E is reached (Third path). The running locus P forms a clothoid curve where a section BC is an arc having a radius of Rmin, and a section CD is a curve having a curvature of $γ_0$ at an end and a curvature of 1/Rmin at the other end, and a section DE is a curve having a curvature of 1/Rmin at an end and a curvature of 0 at the other end.

In some cases where the deflection angle θ is small, the running locus has no arc section. The amount of change Δθ in the deflection angle θ in the section BC is expressed as in equation (1).

$$Δθ = \int_B^E γ(p)dp \quad (1)$$

In equation (1), γ(p) represents the curvature at a running distance p. That is, the amount of change Δθ in the deflection angle equals an area $S_0$ indicated in FIG. 5A. This area can be expressed by γmax×($L_1+L_2$) where $L_1$ is the path length of the section BC (the path length of the section DE is also $L_1$) and $L_2$ is the path length of the section CD, if the path includes an arc section. If δθ is small, the area can be expressed by $L_1×ω^2$ provided that the amount of change in curvature with respect to the running distance is constant at ω during increase, and at −ω during decrease. Therefore, a path can be determined by simple computation.

Next, the length of the basic path $P_0$ in the direction X and the length thereof in the direction Z are determined (step S8). The lengths Xf, Zf of the basic path $P_0$ in the directions X, Z can be determined as in equations (2) and (3).

$$Xf = \int_B^E \sin(θ(p))dp \quad (2)$$

$$Zf = \int_B^E \cos(θ(p))dp \quad (3)$$

In these equations, θ(p) is the deflection angle at a running distance p.

Subsequently, straight-line paths are added to the basic path $P_0$ so as to set a target path $P_1$ (step S10).

That is, as indicated in FIG. 6, extensions are added to the two opposite ends of the basic path $P_0$ so as to provide a path extending from the point A to the point G. Specifically, when the path length of the straight-line path from the point A to the starting point B of the basic path $P_0$ is represented by Lo and the path length of the straight-line path from the end point E of the basic path $P_0$ to the point G is represented by $L_3$, the following equations (4) and (5) hold.

$$X_0 = L_0 × \sin θ_0 + Xf \quad (4)$$

$$Z_0 = L_0 × \cos θ_0 + Zf + L_3 \quad (5)$$

Since all the terms except $L_0$ and $L_3$ are known, $L_0$ and $L_3$ can easily be determined from equations (4) and (5).

FIG. 5B indicates the correspondence of the curvature to the running distance along the target path $P_1$ set as described above. FIG. 6 indicates a locus defined by the target path $P_1$. As for the path $P_1$, the target path is independent of the speed of the vehicle and the acceleration thereof. Therefore, an advantage is that the control of following the path during the driving of the vehicle can be simplified.

Subsequently in step S12, it is determined whether a path has been set successfully.

Specifically, it is determined that a path has been set, if neither one of $L_0$ and $L_3$ is negative, that is, if $L_0$ and $L_3$ are 0 or positive. The case where $L_0$ is negative means a case where the length Xf of the basic path $P_0$ in the direction X is greater than the distance ($x_0$) between the point A and the point G in the direction X. The case where $L_3$ is negative is a case where the length Zf of the basic path $P_0$ in the direction Z is greater than a length obtained by subtracting the length $L_0 \times \sin\theta$ of the straight-line path extending from the point A to the point B in the direction Z from the distance $z_0$ between the point A and the point G in the direction Z. If it is determined in step S12 that it is not possible to properly set a path that reaches the target position point G from the point A, the process proceeds to step S50. In step S50, it is indicated to the driver via the monitor 34 and the speaker 33 that the vehicle cannot reach the target position point G from the present point A. After that, the process ends. The driver can initiate the parking assist operation again after moving the vehicle 200 if necessary.

If a path is successfully set, the process proceeds to step S14, in which a guiding control is performed. At this time, it is preferable that when the shift lever is set at the reverse position, the parking assist ECU 1 instruct a drive force system (not shown) to execute an engine torque increase control. The torque increase control is a control of causing a change to a high driving force state (state of increased torque) by operating the engine at a revolution speed that is higher than a normal idling speed. This control expands the range of vehicle speed where a driver can adjust the vehicle speed by using only the brake pedal without operating the accelerator, so as to improve the operability of the vehicle. If the driver operates the brake pedal, the braking force applied to each wheel is adjusted in accordance with the degree of depression of the pedal, and therefore the vehicle speed is correspondingly adjusted. At this time, it is preferable to perform the guarding of an upper limit vehicle speed by controlling the braking force applied to each wheel so as to prevent the vehicle speed detected by the back camera 32 from exceeding the upper limit vehicle speed.

In the control of guiding the vehicle to the target position, the present position of the vehicle is first determined (step S14).

The present position can be determined on the basis of the movement of a characteristic point in the image taken by the back camera 32. The present position can also be determined on the basis of a change in the running distance based on output signals of the tire wheel speed sensors 41 and the acceleration sensor 42, and a change in the steering angle based on an output signal of the steering angle sensor 23.

Then, an actual steering angle control is performed on the basis of a set locus of the running distance-turning curvature (steering angle) set previously from the present position (running distance) (step S16). Specifically, the steer control portion 11, while monitoring the output of the steering angle sensor 23, controls the steering actuator 24 so as to drive the steering shaft 21 and change the steering angle of the steering tire wheels 25 to the set steering angle displacement.

As the vehicle is moved along a target path set as described above, the driver can concentrate on safety-checking surroundings on road and adjusting the vehicle speed. Furthermore, since each wheel receives a braking force corresponding to the amount of depression of the brake pedal accomplished by the driver, the driver can safely decelerate or stop the vehicle even if there exists an obstacle, a pedestrian, or the like on the road.

After the steering angle control, it is determined whether the present position has deviated from the target path. If there is a great deviation, it is determined that path correction is needed (step S18).

The deviation from the target path can be determined, for example, by accumulating the deviation of the present position from the target position or the deviation of the actual amount of steer from the target amount of steer with respect to the distance of run. If path correction is needed, the process proceeds to step S6, in which a path is set again.

Conversely, if there is only a small deviation from the target path, the process proceeds to step S20, in which it is determined whether the vehicle has reached the vicinity of the target parking position point G. If the target parking position has not been reached, the process returns to step S14 in order to continue the assist control. If it is determined that the target parking position has been reached, the process proceeds to step S22. In step 22, it is indicated to the driver via the monitor 34 or speaker 33 that the target parking position has been reached. After that, the process ends.

Thus, a basic path is determined, and a straight-line path is added to one of the two ends or each end of the basic path, so as to set a path. Therefore, the algorithm of path computation is simplified. Furthermore, since the calculation is simplified, the computation load is relatively small, and real-time computation can easily be performed by using a reduced computer resource. Furthermore, since there is no accuracy deterioration in calculation, high-accuracy guidance to the target position can be accomplished.

Figure 7:
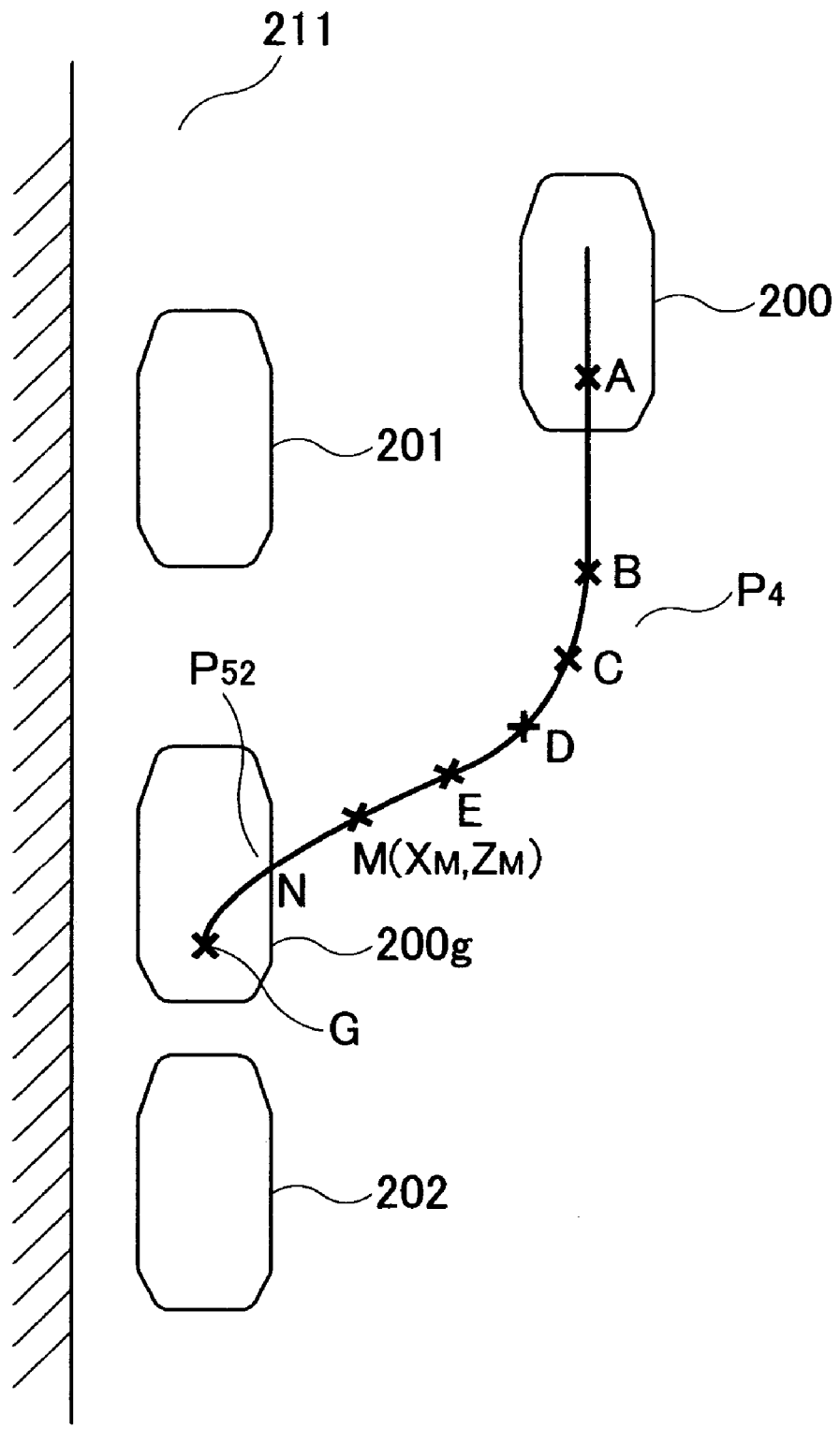
FIG. 7 is a diagram illustrating a parallel parking operation that is a parking assist in a second control form of the apparatus shown in FIG. 1.
Figure 8A:
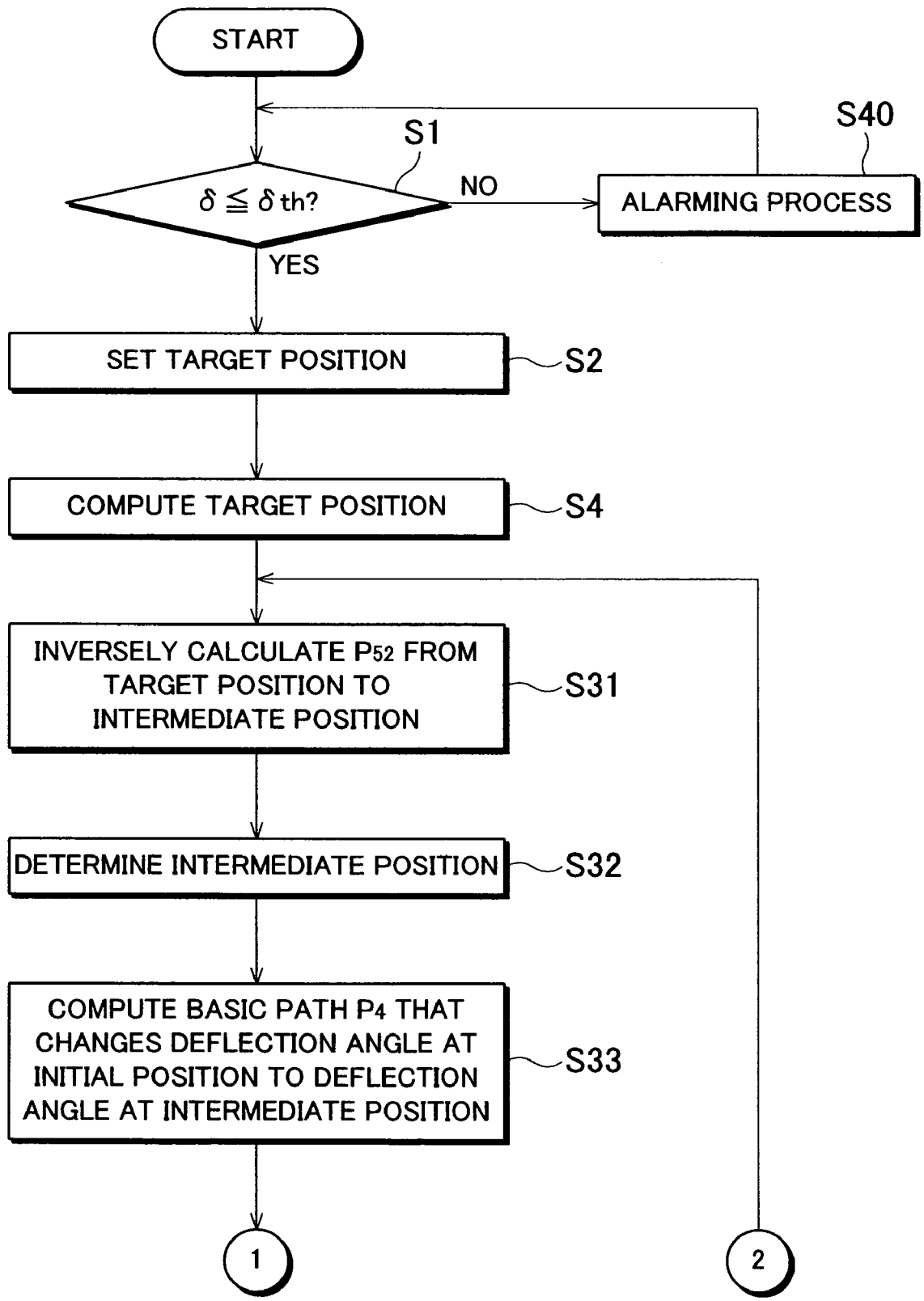
FIG. 8 is a flowchart illustrating a control in the second control form of the apparatus shown in FIG. 1.
Figure 8B:
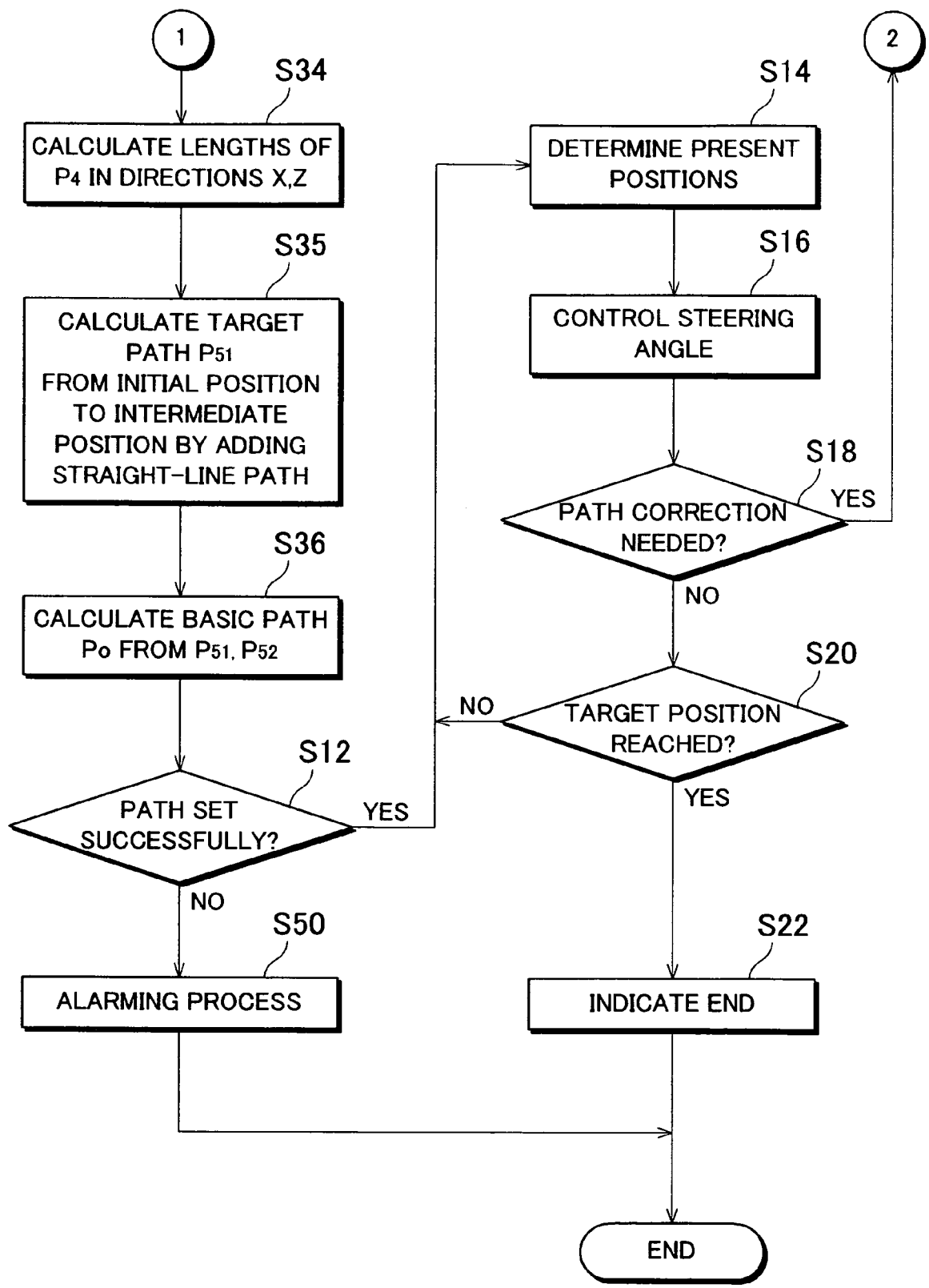
Figure 9A:
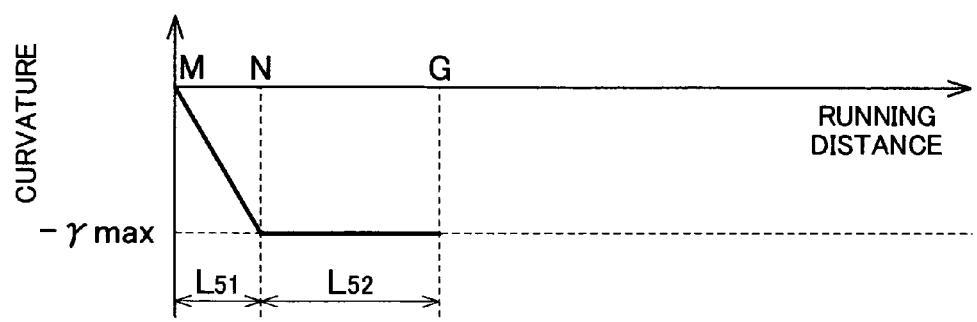
FIGS. 9A to 9C are diagrams each illustrating an assist path set by the control form illustrated in FIG. 8, as a relationship between the running distance and the curvature.
Figure 9B:
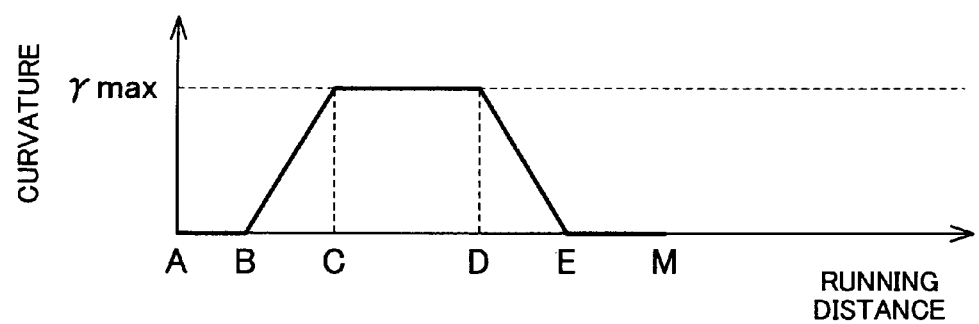
Figure 9C:
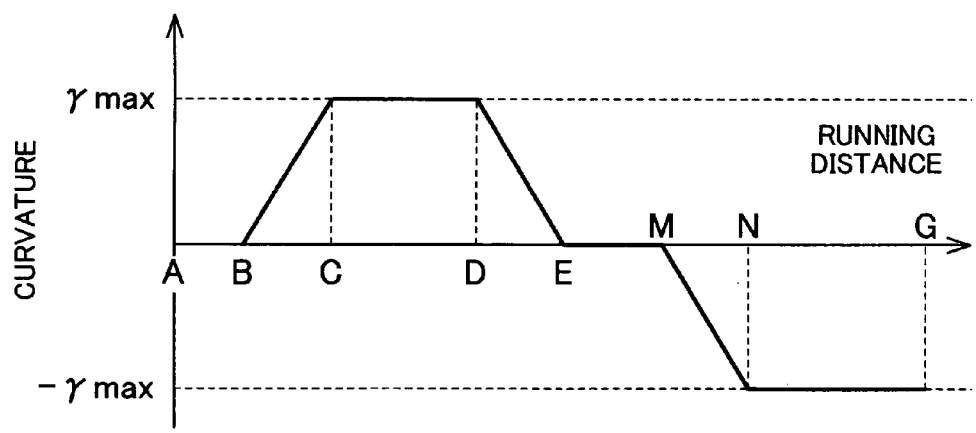

Next, a second embodiment of the assist operation will be described. In the second control form, assist is performed in a generally-termed parallel parking operation as illustrated in FIG. 7 in which an own vehicle 200 is backed into a parking space 221 between a forward vehicle 201 and a rearward vehicle 202 that are parked along a side end of a road 211. FIGS. 8A and 8B is a flowchart illustrating a second control form. FIG. 9A to 9C are diagrams illustrating the setting of an assist path in this control.

This embodiment and the foregoing first embodiment are substantially the same in terms of the process up to the determination of a relationship between the reference point and the target position.

The path $P_{52}$ up to a steering switch point M, that is, an intermediate point where the steering angle is reversed, is determined through inverse operation from the target parking position point G (step S31).

Hereinafter, the position coordinates of the intermediate position point M are expressed as $(X_M, Z_M)$. It is assumed that the deflection angle $\theta_M$ at the intermediate position point M takes a predetermined set value. Herein, in order to simplify the calculation, the path $P_{52}$ is assumed to be a path in which the amount of change in the curvature with respect to the running distance from the intermediate point M is changed at $-\omega$, and after the curvature reaches $-\gamma$max at a point N, the curvature of $-\gamma$max is maintained until the target position G is reached (hereinafter, referred to as "second basic path").

A relationship between the running distance and the curvature on the path $P_{52}$ is indicated in FIG. 9A, in which $L_{51}$ is the path length between the points M and N, and $L_{52}$ is the path length between the point N and the point G. Since the area S on the running distance-curvature curve corresponds to the amount of change in the deflection angle as described above, the area S needs to correspond to $\theta_M$ in order that the deflection angle $\theta$ shall become 0 at the target position. Therefore, the following equations (6) and (7) hold.

$$\theta_M = \left(\frac{L_{51}}{2} + L_{52}\right) \times \gamma_{\max} \tag{6}$$

$$L_{51} = \frac{\gamma_{\max}}{\omega} \tag{7}$$

From the aforementioned relationships, $L_{51}$ and $L_{52}$ are determined. The thus-set path $P_{52}$ is a second basic path.

Next, on the basis of the path $P_{52}$ set as described above, the position coordinates of the intermediate point M are determined (step S32).

The section from the point G to the point N is an arc section. Therefore, the amount of change in the deflection angle $\theta_C$ in this section is equal to the central angle of the arc. Therefore, when the coordinate of the point N are $(X_N, Z_N)$, the following equations (8) to (10) hold.

$$L_{52} = \theta_C \times \gamma_{max} \tag{8}$$

$$x_N = \gamma_{max} \times (1 - \sin \theta_C) \tag{9}$$

$$z_N = \gamma_{max} \times \cos \theta_C \tag{10}$$

From these equations and the path length $L_{52}$ determined as described above, the position coordinates of the point N can be determined. Furthermore, the position of the point M is determined from the position of the point N by inverse operation. With regard to the positional relationship of the point M, the following equations (11) to (13) hold.

$$\theta_M = \theta_C + \int_0^{L_{51}} \gamma(p) dp \tag{11}$$

$$x_M = x_C + \int_0^{L_{51}} \sin(\theta(p)) dp \tag{12}$$

$$z_M = z_C + \int_0^{L_{51}} \cos(\theta(p)) dp \tag{13}$$

From these equations, the position of the intermediate position point M can be computed.

Subsequently, a path from the initial position point A to the point M is computed. This path computing technique is similar to the path computing technique in the case of garage parking. That is, firstly, by a technique similar to step S6, a basic path (first basic path) $P_4$ needed for the change from the present deflection angle of 0 to the state of deflection angle $\theta_M$ is computed (step S33).

Next, by a technique similar to step S8, the lengths of the first basic path $P_4$ in the directions X and Z are determined (step S34).

Subsequently, by a technique similar to step S10, straight-line paths are added to the basic path $P_4$ so as to set a target path $P_{51}$ extending to the point M (step S35).

FIG. 9B is a graph indicating the amount of change in the curvature with respect to the running distance on the first basic path $P_4$ set as described above. This target path $P_{51}$ and the target path $P_{52}$ from the point M are combined, thereby determining a path $P_5$ extending from the point A to the point G (step S36). FIG. 9C indicates the thus-set path $P_5$.

In the foregoing embodiment, a straight-line path is added to the first basic path $P_4$ side. However, if returning the steering wheel to neutral is operated on the side of the second basic path $P_{52}$, a straight-line path may be added to the second basic path side. It is also possible to add straight-line paths to both the first basic path and the second basic path.

The actual guiding process following the setting of the path is the same as that illustrated in FIG. 3, and therefore will not be described again. According to this control form, similar to the case of garage parking operation in the first control form, a basic path for a parallel parking assist operation is determined and straight-line paths are added thereto if necessary, so as to set an actual guiding path. This arrangement simplifies the path computing algorithm. Furthermore, since the calculation is simplified, the computation load is relatively small, and real-time computation can easily be performed by using a reduced computer resource. Furthermore, since there is no accuracy deterioration in calculation, high-accuracy guidance to the target position can be accomplished.

Next, a third control form of the assist operation will be described. Similar to the foregoing first control form, the third control form is provided for executing garage parking assist. This embodiment differs from the foregoing embodiment only in the method of setting a target path from a basic path $P_0$.

Figure 10:
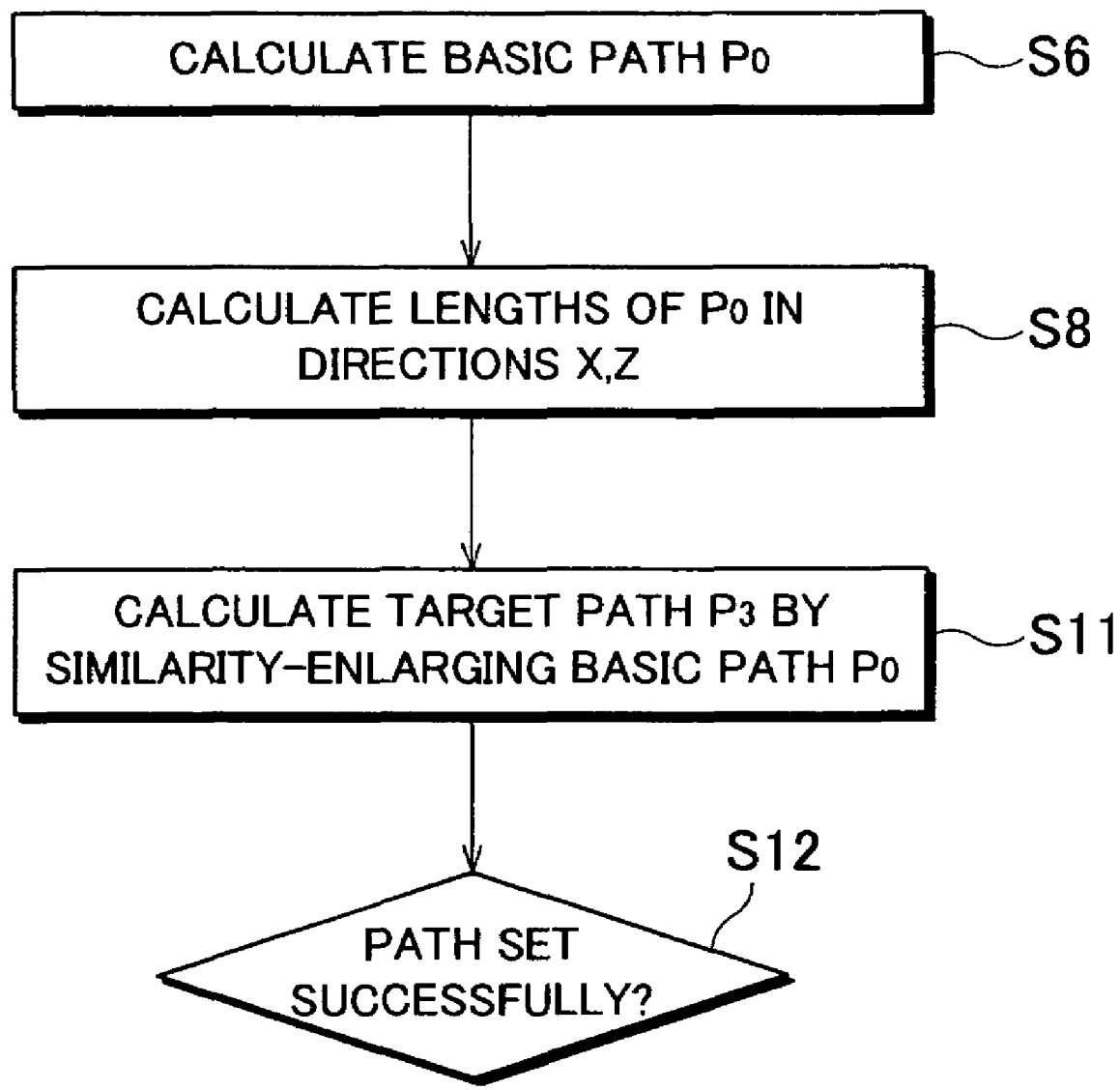
FIG. 10 is a flowchart illustrating a characteristic portion of a third control form of the apparatus shown in FIG. 1.

Specifically, as illustrated in the flowchart of the setting process in FIG. 10, a target path $P_3$ is generated by adding straight-line paths to a similarity-enlarged path $P_2$ obtained through similarity enlargement of a basic path $P_0$, instead of adding straight-line paths to the basic path $P_0$ (step S11).

Figure 11:
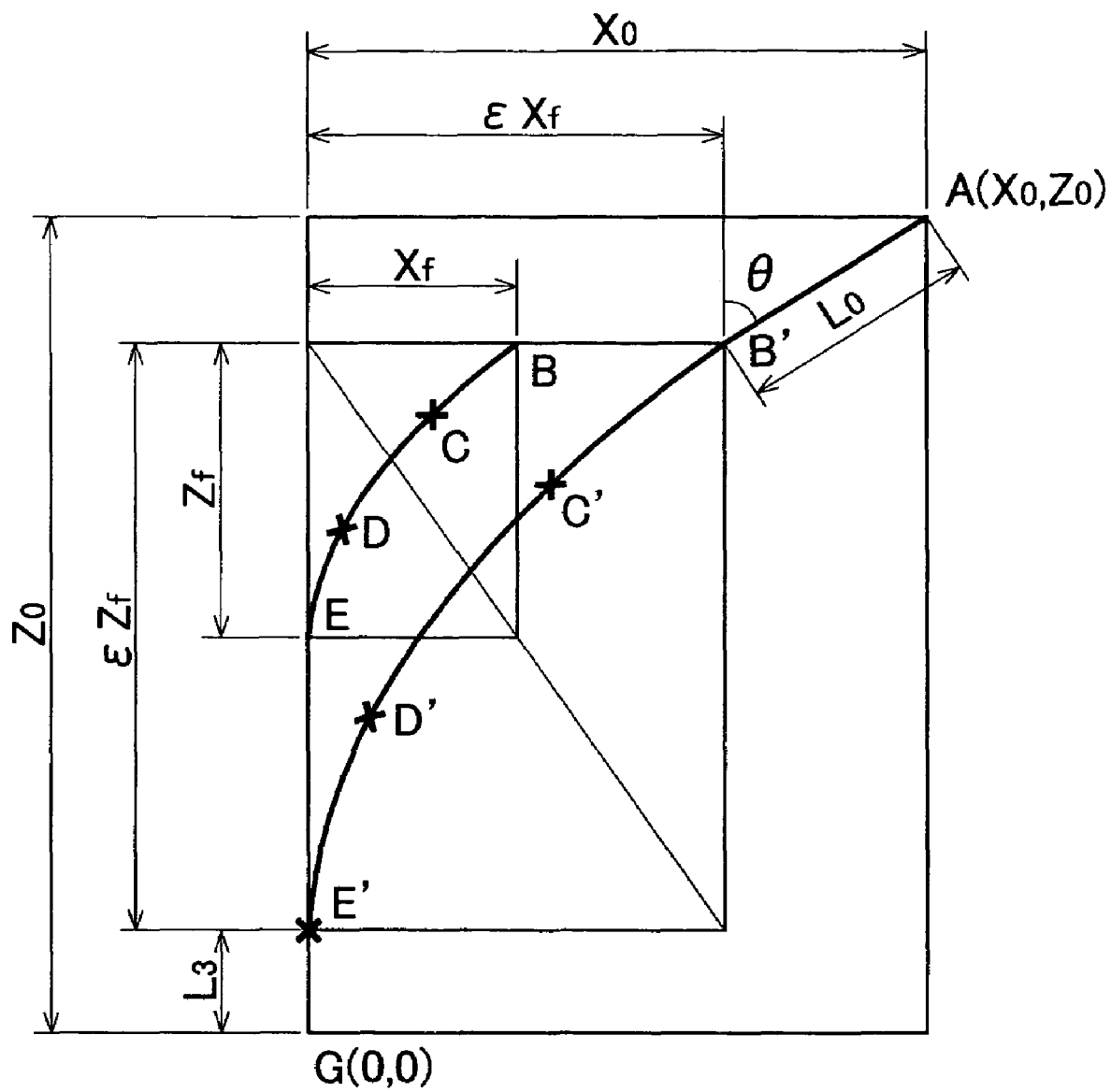
FIG. 11 is a diagram indicating a positional relationship of a path set by the control form illustrated in FIG. 10.

FIG. 11 indicates a positional relationship of a set path. The scaling factor of the similarity enlargement is represented by $\epsilon$, and the starting point and the end point of the similarity-transformed path $P_2$ are represented by B' and E', respectively. When the path length of the straight-line path from the point A to the point B' is represented by $L_0$ and the path length of the straight-line path from the point E' to the point G is represented by $L_3$, the following equations (14) and (15) hold.

$$x_0 = L_0 \times \sin \theta_0 + \epsilon \times Xf \tag{14}$$

$$z_0 = L_0 \times \cos \theta_0 + \epsilon \times Zf + L_3 \tag{15}$$

As for $\epsilon$, if $Zf/Xf$ is less than or equal to $z_0/x_0$, that is, if the ratio between the length of the basic path $P_0$ in the direction Z and the length thereof in the direction X is less than the ratio between the length of the target path in the direction Z and the length thereof in the direction X, and is elongated laterally (in the direction X), it is appropriate to set $\epsilon$ so as to satisfy $\epsilon \leq x_0/Xf$. Conversely, if the basic path is longitudinally elongated, the setting of, for example, $\epsilon = x_0/Xf$, causes the end point of the similarity-enlarged path to go beyond the target parking position point G, so that $\epsilon$ needs to be set at a smaller value. In this case, the maximum value of $\epsilon$ is a value that occurs when $L_3$ is 0, and is expressed as in equation (16) based on equations (14) and (15).

$$\varepsilon = \frac{x_0 - z_0 \tan \theta_0}{Xf - Zf \tan \theta_0} \tag{16}$$

The value of $\epsilon$ for use does not need to be the maximum value, but may be an arbitrary value less than that. If the similarity enlargement factor $\epsilon$ is set, the lengths of the straight-line paths can be calculated via equations (14) and (15). Thus, a target path $P_3$ can be set.

Figure 12:
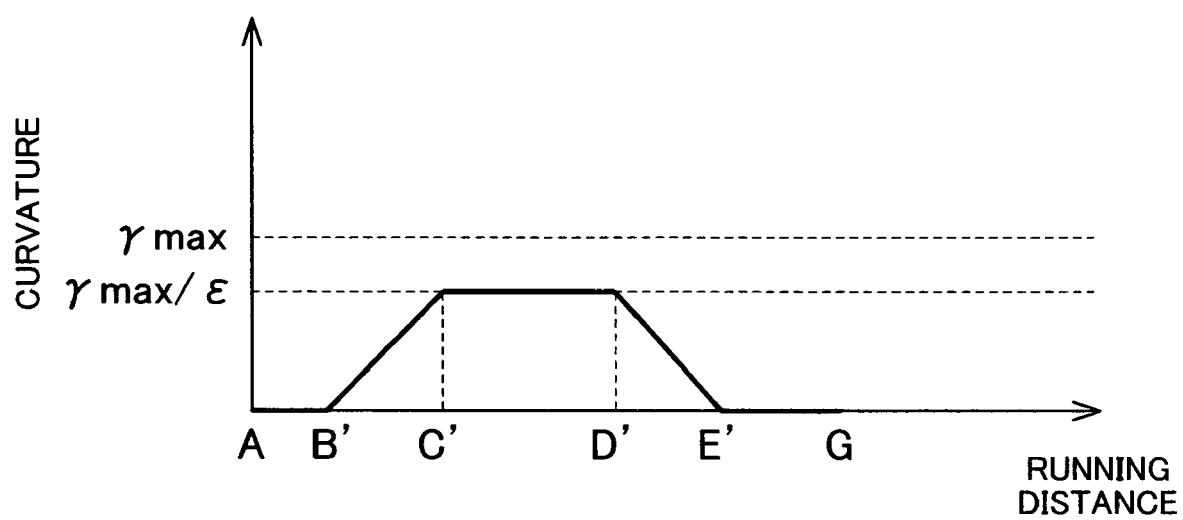
FIG. 12 is a diagram illustrating a path set by the control form illustrated in FIG. 10, as a relationship between the running distance and the curvature.

As for the similarity-enlarged path $P_2$ in the target path $P_3$ set as described above, if the curvature at the position of a running distance p from the point A on the basic path $P_0$ is expressed as $\gamma(p)$, the curvature at the position of a running distance $\epsilon p$ from the point A is expressed as $\gamma(p)/\epsilon$. As indicated in FIG. 12, the similarity-enlarged path $P_2$ is enlarged from the basic path $P_0$ by the ratio of $\epsilon$ in the direction of distance, with compression by the ratio of $1/\epsilon$ in the direction of curvature (enlargement of the turning radius by the ratio of $\epsilon$). Therefore, the area on the running distance-turning curvature graph of the similarity-enlarged path $P_2$ is equal to the area on the running distance-turning curvature graph of the basic path $P_0$, so that the amount of change in the deflection angle remains the same.

Through the similarity transformation, the maximum value of the curvature reduces from γmax on the basic path to $1/\epsilon$ time γmax, that is, γmax/$\epsilon$, and the steering rate ω reduces to $1/\epsilon^2$. As a result, the load on the steering actuator 24 reduces, and the controllability of the steering control improves.

Although the embodiment has been described in conjunction with similarity transformation of a basic path regarding garage parking, a basic path for parallel parking can also be similarity-transformed substantially in the same fashion. In the case of parallel parking, two basic paths exist, that is, the first basic path and the second basic path. As for the similarity enlargement, the two basic paths may be enlarged by the same scaling factor or by their respective scaling factors. It is also possible to similarity-enlarge only one of the basic paths while maintaining the other basic path as it is. In the case of parallel parking, it is preferable that the Z-direction length of the path from the steering switch point on be as short as possible in comparison with the space between the forward vehicle 201 and the rearward vehicle 202, so that the own vehicle will not contact the forward vehicle 201. Therefore, as for the similarity enlargement of the basic paths, it is preferable to give priority to the similarity enlargement of the first basic path.

In the foregoing embodiment, if the initial steering angle (turning curvature) is substantially 0, a path is set, and if the initial steering angle (turning curvature) is great, the setting of a path is not carried out. However, if the initial steering angle is great, it is also possible to instruct the driver to perform stationary steering so as to reduce the initial steering angle substantially to 0. Due to this arrangement, even if the initial steering angle is not substantially 0, the assist control can be continued without a stop. Therefore, the operability during the assist control improves.

Although the basic path may be determined through computation, it is also possible to store quantities of state with respect to the deflection angle θ in the form of maps within the parking assist ECU 1. This arrangement eliminates the need to increase the computing power of the parking assist ECU 1, and allows quicker determination of a path.

The foregoing embodiments are embodiments of the parking assist apparatus having an automatic steering function. However, the invention is applicable not only to the technologies of automatic steering, but is also similarly applicable to technologies of performing steering guidance by indicating appropriate amounts of steer to the driver. Furthermore, the invention is applicable not only to the parking assist apparatus but also to a driving assist apparatus that induces movement in accordance with a path, a lane keep system, etc.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A driving assist apparatus for a vehicle comprising:
   a detecting portion that detects an initial deflection angle at an initial position of the vehicle, the deflection angle being an angle formed between a direction of the vehicle at a target position and a direction of the vehicle at a present direction of the vehicle;
   a setting portion that sets a basic path along which the deflection angle is changed from the initial deflection angle to a state of the deflection angle of 0 by steering under a predetermined condition in accordance with a running distance, wherein the running distance changes with respect to one of a steering angle and a turning curvature; and
   a computing portion that computes a target path that extends from the initial position to the target position by using the basic path as a basis and adding a straight-line path to at least one of a site forward of the basic path and a site rearward of the basic path under a predetermined condition,
   wherein the computing portion computes a target path by similarity-enlarging the basic path.

2. The driving assist apparatus according to claim 1, wherein the basic path includes a path in which the vehicle is driven by increasing the steering angle of the vehicle to a predetermined steering angle, a path in which the vehicle is driven by maintaining the predetermined steering angle, and a path in which the vehicle is driven by decreasing the steering angle to 0.

3. The driving assist apparatus according to claim 1, further comprising an automatic steering portion that automatically steers so as to drive the vehicle along the set target path.

4. The driving assist apparatus according to claim 1, wherein the computing portion computes a target path if the steering angle at the initial position is substantially 0.

5. A driving assist apparatus for a vehicle comprising:
   a detecting portion that detects an initial deflection angle at an initial position of the vehicle, the deflection angle being an angle formed between a direction of the vehicle at a target position and a direction of the vehicle at a present direction of the vehicle;
   a first setting portion that sets a first basic path along which the deflection angle is changed from the initial deflection angle to a predetermined deflection angle by steering under a predetermined condition in accordance with a running distance, wherein the running distance changes with respect to one of a steering angle and a turning curvature;
   a second setting portion that sets a second basic path along which the deflection angle is changed from the predetermined deflection angle to a state of the deflection angle of 0 by steering under a predetermined condition in accordance with the running distance, as a change in the running distance with respect to one of the steering angle and the turning curvature; and
   a computing portion that computes a target path that extends from the initial position to the target position by using the first basic path and the second basic path as a basis and adding a straight-line path to at least one of a site forward of the first basic path, a site between the first basic path and the second basic path, and a site rearward of the second basic path under a predetermined condition,
   wherein the computing portion computes a target path by similarity-enlarging at least one of the first basic path and the second basic path.

6. The driving assist apparatus according to claim 5, wherein the first and second basic paths include a path in which the vehicle is driven by increasing the steering angle of the vehicle to a predetermined steering angle, a path in which the vehicle is driven by maintaining the predetermined steering angle, and a path in which the vehicle is driven by decreasing the steering angle to 0.

7. The driving assist apparatus according to claim 5, further comprising an automatic steering portion that automatically steers so as to drive the vehicle along the set target path.

8. The driving assist apparatus according to claim 5, wherein the computing portion computes a target path if the steering angle at the initial position is substantially 0.

9. A driving assist is performed for a vehicle comprising the steps of:
- detecting an initial deflection angle at an initial position of the vehicle, the deflection angle being an angle formed between a direction of the vehicle at a target position and a direction of the vehicle at a present direction of the vehicle;
- setting a basic path along which the deflection angle is changed from the initial deflection angle to a state of the deflection angle of 0 by steering under a predetermined condition in accordance with a running distance, wherein the running distance changes with respect to one of a steering angle and a turning curvature; and
- computing a target path that extends from the initial position to the target position by using the basic path as a basis and adding a straight-line path to at least one of a site forward of the basic path and a site rearward of the basic path under a predetermined condition,
- wherein the target path is computed by similarity-enlarging the basic path.

10. The driving assist method according to claim 9, wherein the basic path includes a path in which the vehicle is driven by increasing the steering angle of the vehicle to a predetermined steering angle, a path in which the vehicle is driven by maintaining the predetermined steering angle, and a path in which the vehicle is driven by decreasing the steering angle to 0.

11. The driving assist method according to claim 9, further comprising the step of automatically steering so as to drive the vehicle along the set target path.

12. The driving assist method according to claim 9, wherein the target path is computed if the steering angle at the initial position is substantially 0.

13. A driving assist method for a vehicle comprising the steps of:
- detecting an initial deflection angle at an initial position of the vehicle, the deflection angle being an angle formed between a direction of the vehicle at a target position and a direction of the vehicle at a present direction of the vehicle;
- setting a first basic path along which the deflection angle is changed from the initial deflection angle to a predetermined deflection angle by steering under a predetermined condition in accordance with a running distance, wherein the running distance changes with respect to one of a steering angle and a turning curvature;
- setting a second basic path along which the deflection angle is changed from the predetermined deflection angle to a state of the deflection angle of 0 by steering under a predetermined condition in accordance with the running distance, as a change in the running distance with respect to one of the steering angle and the turning curvature; and
- computing a target path that extends from the initial position to the target position by using the first basic path and the second basic path as a basis and adding a straight-line path to at least one of a site forward of the first basic path, a site between the first basic path and the second basic path, and a site rearward of the second basic path under a predetermined condition,
- wherein the target path is computed by similarity-enlarging at least on of the first basic path and the second basic path.

14. The driving assist method according to claim 13, wherein the first and second basic path includes a path in which the vehicle is driven by increasing the steering angle of the vehicle to a predetermined steering angle, a path in which the vehicle is driven by maintaining the predetermined steering angle, and a path in which the vehicle is driven by decreasing the steering angle to 0.

15. The driving assist method according to claim 13, further comprising the step of automatically steering so as to drive the vehicle along the set target path.

16. The driving assist method according to claim 13, wherein the target path is computed if the steering angle at the initial position is substantially 0.

17. A driving assist apparatus for a vehicle comprising:
- detecting means for detecting an initial deflection angle at an initial position of the vehicle, the deflection angle being an angle formed between a direction of the vehicle at a target position and a direction of the vehicle at a present direction of the vehicle;
- setting means for setting a basic path along which the deflection angle is changed from the initial deflection angle to a state of the deflection angle of 0 by steering under a predetermined condition in accordance with a running distance, wherein the running distance changes with respect to one of a steering angle and a turning curvature; and
- computing means for computing a target path that extends from the initial position to the target position by using the basic path as a basis and adding a straight-line path to at least one of a site forward of the basic path and a site rearward of the basic path under a predetermined condition, the computing means computing the target path by similarity-enlarging the basic path.

18. A driving assist apparatus for a vehicle comprising:
- detecting means for detecting an initial deflection angle at an initial position of the vehicle, the deflection angle being an angle formed between a direction of the vehicle at a target position and a direction of the vehicle at a present direction of the vehicle;
- first setting means for setting a first basic path along which the deflection angle is changed from the initial deflection angle to a predetermined deflection angle by steering under a predetermined condition in accordance with a running distance, wherein the running distance changes with respect to one of a steering angle and a turning curvature;
- second setting means for setting a second basic path along which the deflection angle is changed from the predetermined deflection angle to a state of the deflection angle of 0 by steering under a predetermined condition in accordance with the running distance, as a change in the running distance with respect to one of the steering angle and the turning curvature; and
- computing means for computing a target path that extends from the initial position to the target position by using the first basic path and the second basic path as a basis and adding a straight-line path to at least one of a site forward of the first basic path, a site between the first basic path and the second basic path, and a site rearward of the second basic path under a predetermined condition, the computing means computing the target path by similarity-enlarging at least one of the first basic path and the second basic path.

* * * * *